Dec. 6, 1927.  
S. W. WILKINSON  
VENDING APPARATUS  
Filed May 5, 1921  
1,651,857  
6 Sheets-Sheet 1
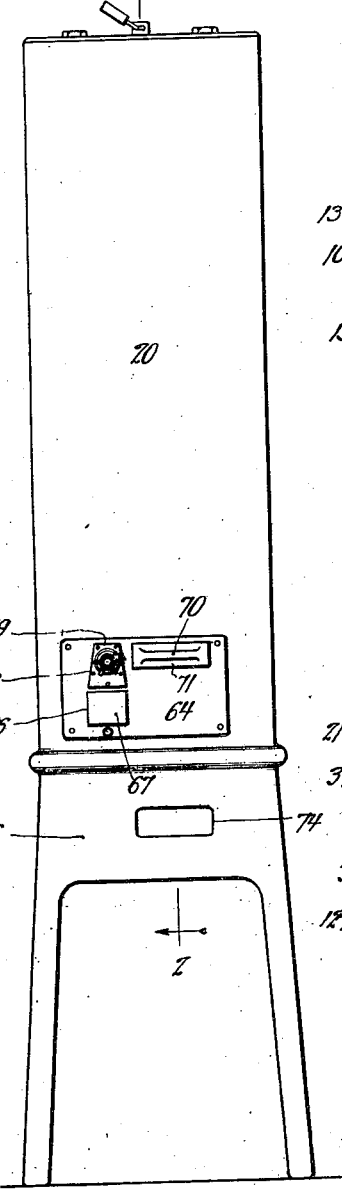
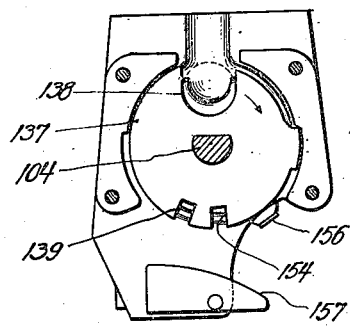
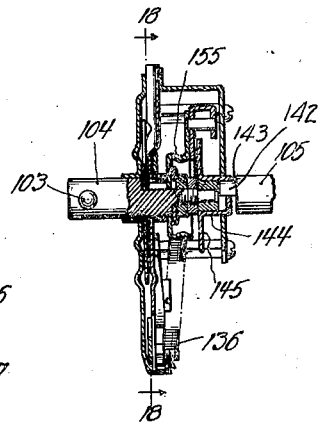
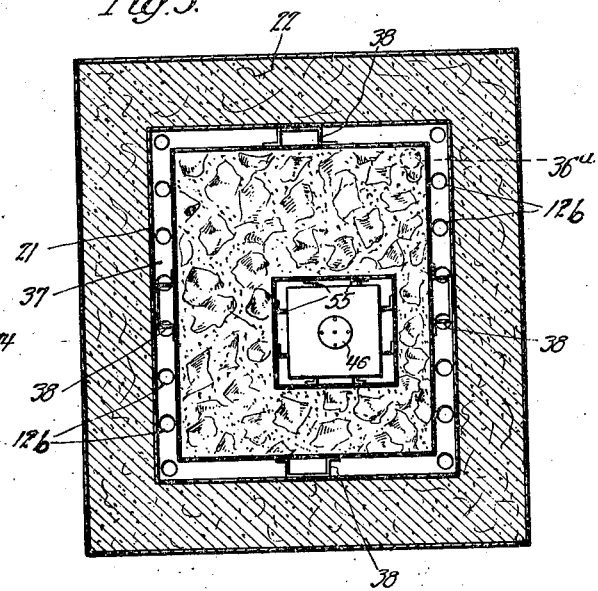
Inventor:  
Stanley W. Wilkinson,  
By: John Howard McElroy  
his Atty.

Dec. 6, 1927.
S. W. WILKINSON
1,651,857
VENDING APPARATUS
Filed May 5, 1921   6 Sheets-Sheet 2
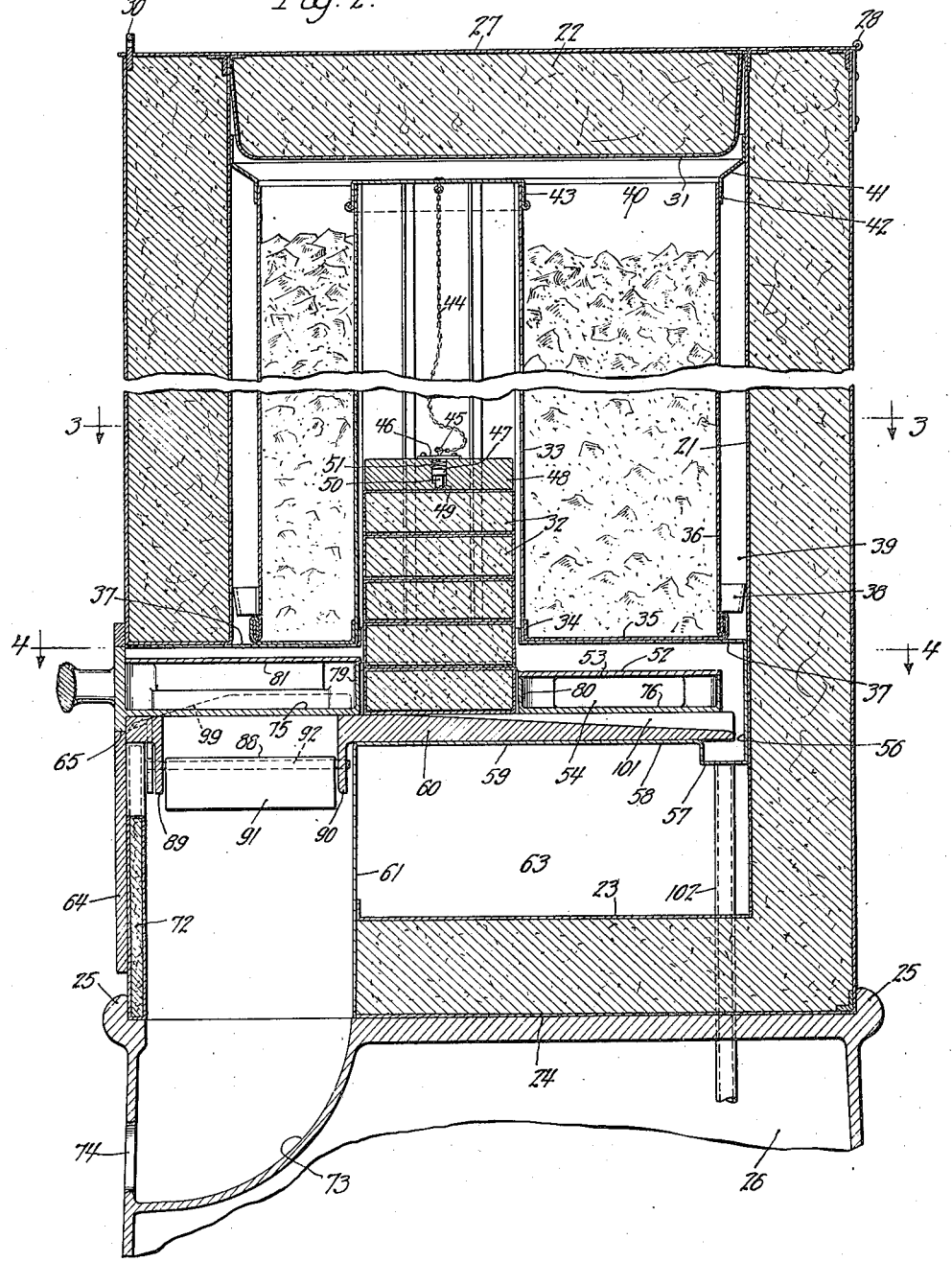

Dec. 6, 1927.  
S. W. WILKINSON  
1,651,857  
VENDING APPARATUS  
Filed May 5, 1921  
6 Sheets-Sheet 3
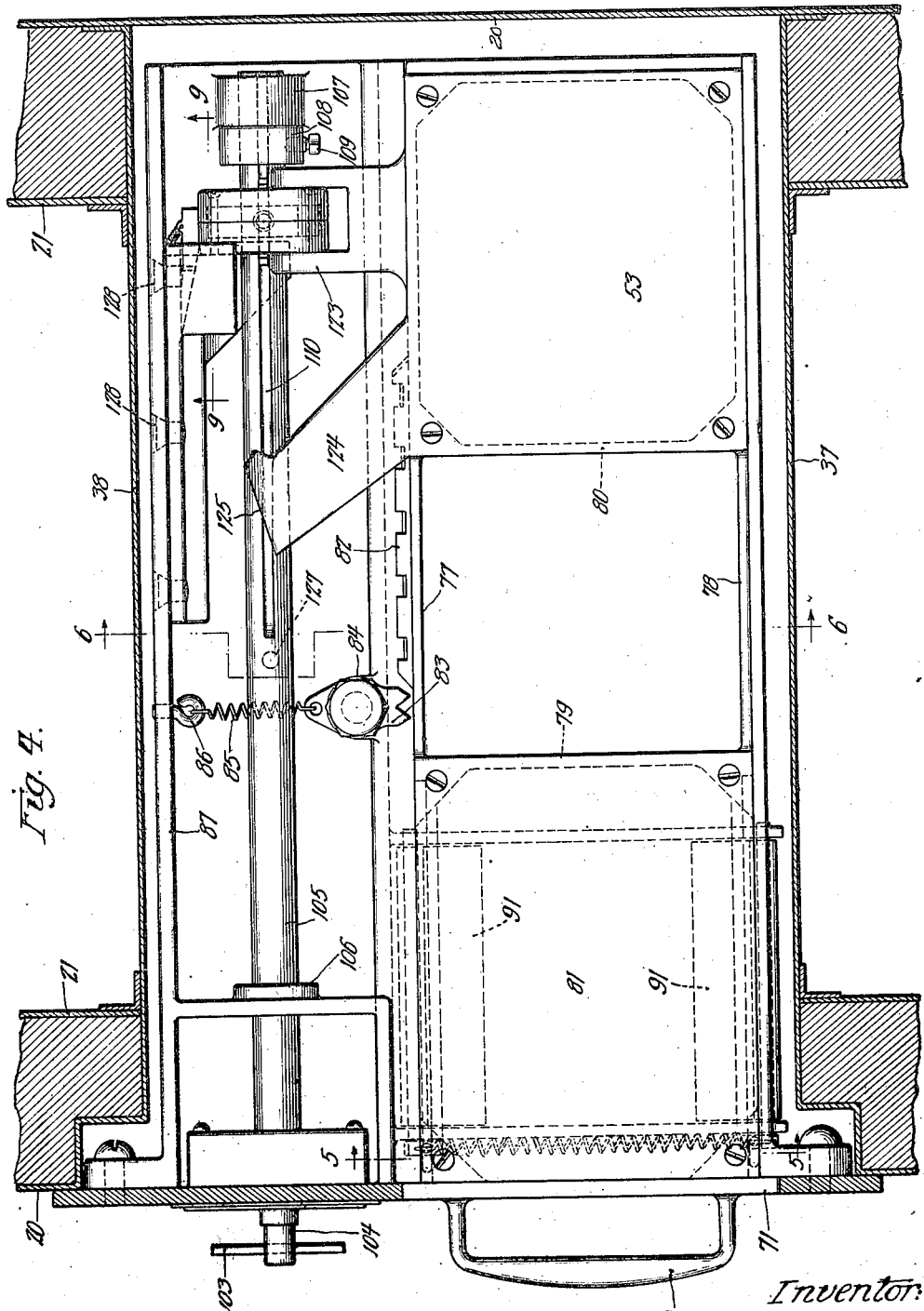

Dec. 6, 1927.
S. W. WILKINSON
1,651,857
VENDING APPARATUS
Filed May 5, 1921 6 Sheets-Sheet 4
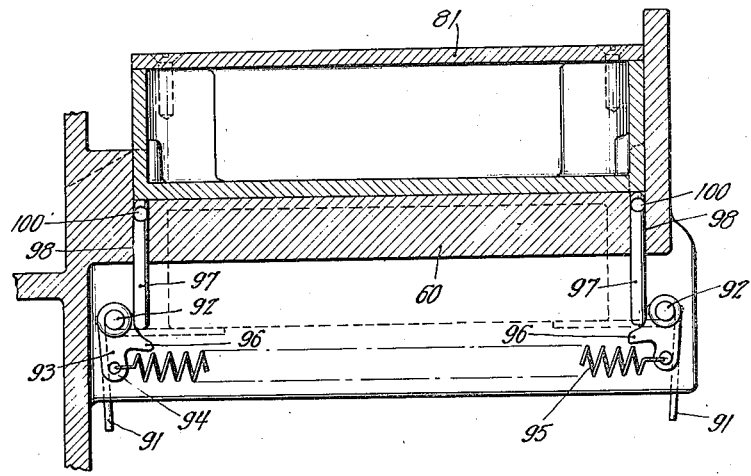
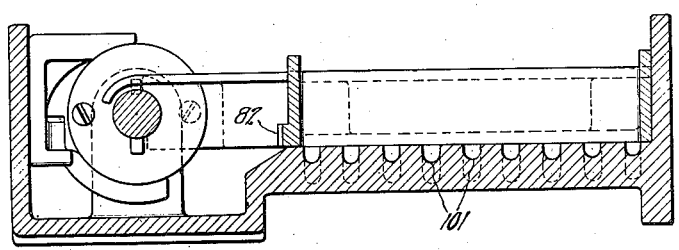
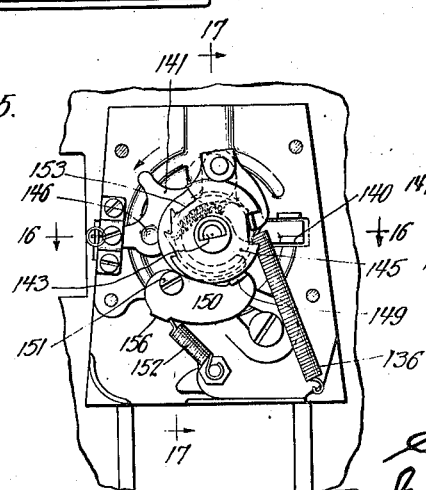
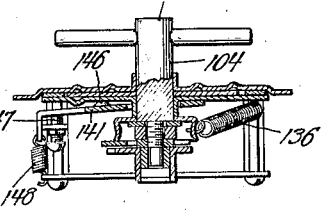

Dec. 6, 1927.

S. W. WILKINSON 1,651,857

VENDING APPARATUS

Filed May 5, 1921  6 Sheets-Sheet 5

Inventor:
Stanley W. Wilkinson
By John Howard McElroy
his Atty.

Dec. 6, 1927.

S. W. WILKINSON

VENDING APPARATUS

Filed May 5, 1921

Inventor:
Stanley W. Wilkinson,
By John Howard McElroy Atty

Patented Dec. 6, 1927.

1,651,857

UNITED STATES PATENT OFFICE.

STANLEY W. WILKINSON, OF WAUKEGAN, ILLINOIS, ASSIGNOR OF TWO-FIFTHS TO WILLIAM C. DAVIS, INDIVIDUALLY, TWO-FIFTHS TO WILLIAM C. DAVIS, TRUSTEE, OF CHICAGO, ILLINOIS; AND ONE-FIFTH TO LAWRENCE HUGHES, OF LOS ANGELES, CALIFORNIA.

VENDING APPARATUS.

Application filed May 5, 1921. Serial No. 467,100.

My invention is concerned with a novel vending apparatus, whereby I am enabled successfully to combine a package delivering mechanism with a package holding tube that is located inside of and spaced away from an outer heat insulating casing so that refrigerating material, such as ice, can be placed in the chamber between the tube and the casing. While this feature is herein fully described, it is claimed only in my divisional application 59,822, filed October 1, 1925.

It is further concerned with a novel package vending apparatus in which a drawer reciprocates beneath a stack of packages, in connection with which I provide a temporary support for a delivered package upon which it is placed by the outward movement of the drawer, and where it remains until the drawer is shut and locked on its return movement so as to insure the drawer being closed and locked before the package is delivered.

It is further concerned with a novel package vending apparatus employing a locking knob, a delivery drawer, and supporting wings such that when the locking knob is rotated to unlock the drawer, the latter can be pulled out, delivering a package onto the supporting wings by which it is held until the drawer is shoved home so as to be locked again, at which time the package is delivered by the wings.

It is further concerned with a novel mechanism for preventing the further operation of the delivery mechanism when the supply of packages is exhausted.

It is finally concerned with certain novel devices and combinations for the purpose described that will be hereinafter first fully described, and then particularly pointed out in the claims.

To illustrate my invention, I annex hereto six sheets of drawings, in which the same reference characters are used to designate identical parts in all the figures of which—

Fig. 1 is a front elevation of an apparatus embodying my invention;

Fig. 2 is a vertical section on an enlarged scale on the line 2—2 of Fig. 1;

Fig. 3 (Sheet 1) is a section on the line 3—3 of Fig. 2, but on a smaller scale;

Fig. 4 is a horizontal section, on the line 4—4 of Fig. 2, but on a larger scale;

Figure 7:
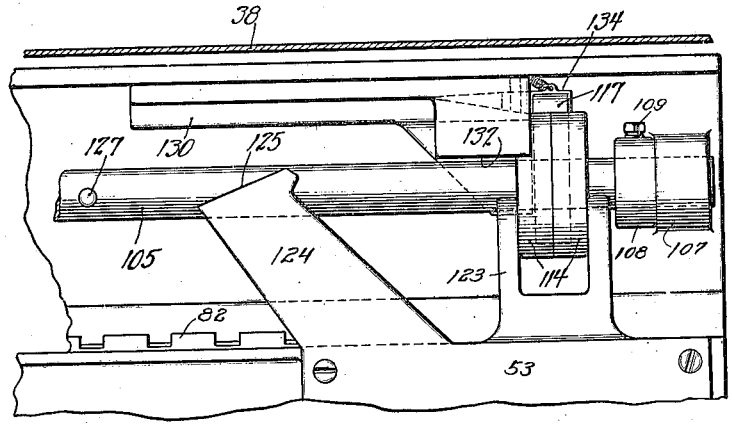
Figure 8:
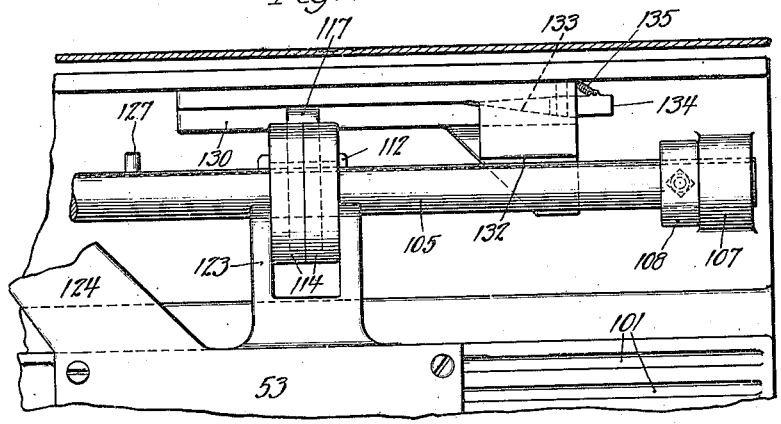
Figure 9:
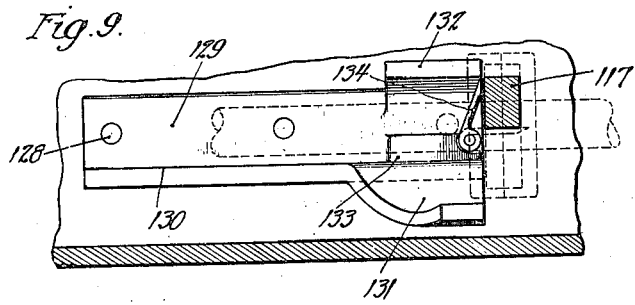
Figure 10:
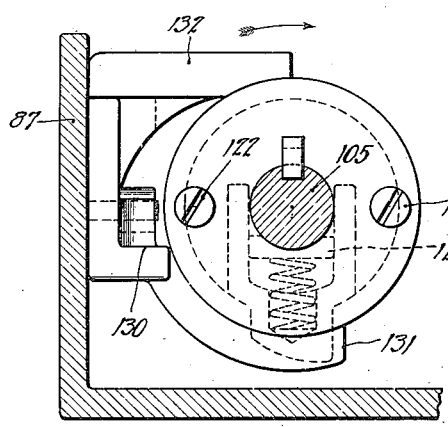
Figure 11:
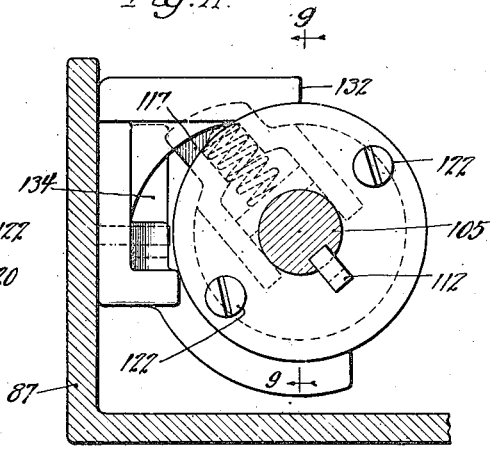
Figure 12:
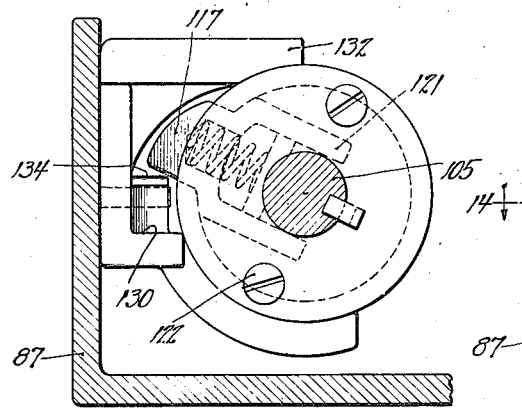
Figure 13:
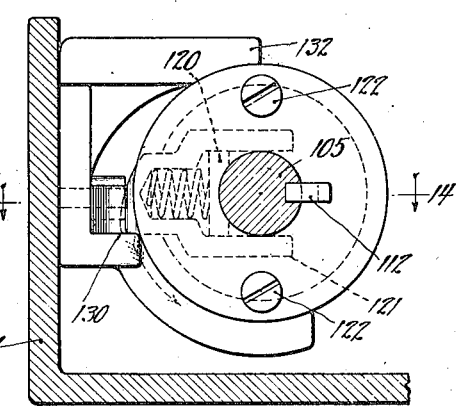
Figure 14:
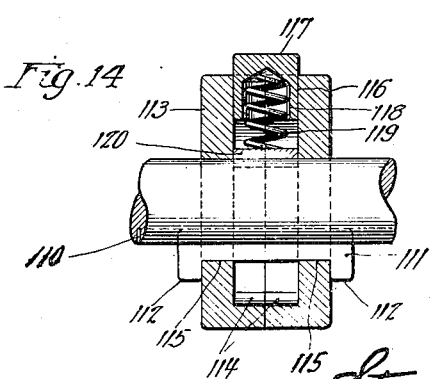

Figs. 5 and 6 are views on the lines 5—5 and 6—6 Fig. 4;

Fig. 7 is a top plan view showing a portion of the mechanism seen in Fig. 4, but in a different position of the parts;

Fig. 8 is a similar view in a still different position;

Fig. 9 is a view in section as seen on the line 9—9 of Fig. 4;

Fig. 10 is a view in section as seen on the line 6—6, but on a larger scale and with the cam plate removed;

Figs. 11, 12 and 13 are views similar to Fig. 10, but showing the mechanism in different positions;

Fig. 14 is a detail in section on the line 14—14 of Fig. 13;

Fig. 15 (Sheet 4) is a view of the coin receiving mechanism with the front plate removed;

Fig. 16 is a detail in section on the line 16—16 of Fig. 15;

Fig. 17 (Sheet 1), is a detail in section on the line 17—17 of Fig. 15; and

Fig. 18 is a view in section on the line 18—18 of Fig. 17.

My novel vending apparatus was devised more especially for vending cakes of ice-cream suitably wrapped in oiled paper, although some features thereof are capable of use in vending apparatus generally.

Where the apparatus is employed to vend cakes of ice-cream, as above stated, the main or outer casing 20 is preferably made of sheet metal and is preferably rectangular in horizontal cross-section, as shown in Fig. 3, and has an inner wall 21, parallel to the outer wall and also preferably made of sheet metal, and with a heavy layer of some suitable heat insulating material 22 interposed between the two walls and between the bottom 23 of the inner casing 11 and the bottom 24 of the outer casing. This outer casing rests in a seat defined by the vertical flange 25 formed on the top of the four-legged base casting 26, in a manner which will be readily understood. The top of the outer casing is formed by the sheet metal cover 27, which is preferably hinged at 28, and has a recess at its other side passing over the apertured ear 30 secured to the casing 20 so a padlock can be passed through the aperture in the ear 30 to hold the cover locked in position to prevent any attempt to steal the ice-cream therefrom. The cover 27 is also insulated by securing to the under side thereof the sheet metal container portion 31 in which is placed the customary insulating material 22. The cakes 32 of ice-cream are stacked one on the other in an inner holder tube 33, which is substantially square in cross-section, made of sheet metal, with air-tight joints which are preferably lapped, riveted and heavily soldered, and it is secured at its bottom by an air-tight joint in the upwardly turned flanges 34 surrounding an opening formed in the sheet metal bottom 35 of the ice containing tank made up of the sheet metal outer walls 36, said bottom, and the inner walls formed by the vertical walls of the container 33, as seen in Figs. 2 and 3. This container rests on the sheet metal bottom piece 37 extending across the entire interior of the apparatus between the walls 21, from which walls 21 the walls 36 are spaced by the four sheet metal abutments 38 secured to the outside of the walls 36 and preferably beveled on their outer faces, as shown. These abutments 38 insure the uniform air space 39 between the walls 21 and the walls 36, thus furnishing additional means of heat insulation so as to prevent the rapid melting of the ice 40, which is placed in the container in the manner which will be readily understood. The primary function, however, of this air space is to provide means whereby the temperature can be equalized between the top and the bottom of the holder 33. As the device was originally constructed, I did not employ the air space 39, and I found that the lower cakes of ice cream softened although the upper ones remained hard. This result I conceived to be due to the unmelted ice floating at the top, keeping the top cakes cold, while the water in the bottom, being somewhat higher in temperature, permitted the cakes to soften. When the air chamber was added, as in the present application, the circulation of the air about the ice holder caused the temperature to become equalized throughout the container and in the space beneath the delivery slide, and I had no more trouble with the lower cakes of ice cream getting soft so long as any of the ice remained unmelted. To prevent any moisture which condenses on the portion 31 from getting into this air space, and to prevent the air in the space from being changed when the cover 27 is opened, I provide the inwardly and downwardly projecting sheet metal flange 41 which extends from the inner wall 21 to the tops of the walls 36, to which it is secured by means of the vertical flange 42 made integral therewith and soldered or otherwise secured to the walls 36. The container 33 is provided with a sheet metal cap 43 from which depends the chain 44 secured at its lower end in the eye 45 fastened to the plate 46 which closes a cylindrical recess 47 in the body of the follower 48, which is placed on the uppermost package 32 of ice-cream when the container is filled. The aperture 47 has the reduced extension 49 passing through the bottom of the follower 48, and in the recess 47 and the extension 49 I place the headed plunger 50, whose weight is preferably reinforced by the light helically coiled expanding spring 51 so that the plunger 50 will co-operate with the aperture 52 in the cover plate 53 of the drawer casting 54 when the drawer is pulled out and the supply of cakes is exhausted, so as to lock the drawer in its pulled out position so that no further attempt will be made to operate it when the supply of ice-cream is exhausted. The sweating of the metal due to the cold tends to freeze the cakes to the walls of the container 33, and to prevent this I secure on the inner walls of the container 33 a plurality of small angle bars 55 on all four sides, which space the cakes 32 away from the walls and furnish very small surfaces where the cakes might tend to freeze to the contacting metal.

The bottom piece 37 has the downwardly turned portion 56, engaging the rear wall 21, and an inwardly turned portion 57 with an upwardly turned portion 58, and the horizontal portion 59, which forms the support for the drawer supporting casting 60. An extension 61 of the sheet metal 59 forms the rear wall of a passage 62 for the ice-cream cakes, and it and the portion 23 and the portion 59 and the vertical walls 21 form a cold air space 63 surrounding the drawer casting 54 and the supporting casting 60. A front plate 64 (see Figs. 1 and 2) is secured to the casing 20 and contains an aperture 65 for the drawer slide and also an aperture 66 for the coin box 67 locked therein, and an aperture 68 in which is placed the coin controlling mechanism generally designated by the reference character 69. The drawer slide 54 is provided with the handle 70 and the rectangular portion 71 fitting in and closing the rectangular aperture 65 in the plate 64. As the sheet metal portion of the casing 20 does not extend below the plate 64, I place back of the plate 64 the sheet 72 of insulating material, which forms the front of the passage 62, and rests on the adjacent bearing formed by the flange 25. Below the passage 62 in the cast base 26, I form the curved pocket 73 into which the cakes are finally delivered by the mechanism to be hereinafter described, and through the front wall of the casting 26, I place the aperture 74 through which the cake is withdrawn from the pocket 73 when it has been finally delivered and is available to the purchaser.

Referring now more especially to Figs. 2 and 4, the drawer is made up of a generally rectangular casting having the bottom portions 75 and 76 and the side walls 77 and 78, and the transverse centrally located walls 79 and 80, the walls 79 and 80 and the portions of the walls 77 and 78 between them forming the boundaries of the rectangular recess of the drawer in which the cakes of ice-cream are deposited. The drawer member also has the cover plate 81 for the front portion thereof, and it has cast or otherwise formed on its side the complete stroke teeth or bar 82 which co-operates with the complete stroke dog 83 pivoted on the bearing lug 84 of the casting and having the helically coiled contractile spring 85 secured at one end thereto and at the other end to the eye 86 secured in the vertical wall 87 of the drawer supporting casting 60. The purpose of this complete stroke mechanism is to compel the drawer to be shoved all the way in after the return movement has begun, and it will be understood that the drawer is locked to start with until the coin mechanism has been operated, after which it is unlocked so that it can be drawn out far enough to bring the cake of ice-cream 32 that is in the central portion thereof into register with the passage 88 which is formed in the bottom of the casting 60, and which is bounded by the downwardly projecting flanges 89 and 90 at the front and rear thereof. Pivoted in these flanges 89 and 90 are a pair of leaves 91 each secured on a rod 92, the ends of which pass through suitable bearing apertures in the flanges 89 and 90, and the front ends of these rods 92 have secured thereon in front of the flange 89 the ears 93, which are provided with the apertures 94 in which the ends of the helically coiled contractile spring 95 are secured and also with the lugs 96 which co-operate with the lower ends of the vertically disposed pins 97 which slide in the vertical guideways 98 formed in the drawer supporting casting 60, as seen in Fig. 5. The drawer casting is provided on either side with the cam portions 99, seen in dotted lines in Fig. 2, which co-operate with the turned down ends 100 of the pins 97 when the drawer is shoved home to force said pins down against the tendency to lift them up caused by their co-operation with the upper surfaces of the lugs 96, which, when the drawer is open are drawn up into the dotted line position shown in Fig. 5 by the action of the spring 95, so that when the drawer is open, the leaves 91 are held by the spring in a horizontal position where they support the adjacent edges of the cake 32 which is delivered thereto by the drawer when it is pulled out. The spring 95 will of course be strong enough to hold the leaves 91 in their horizontal position with sufficient strength to cushion the fall of the cake on the leaves and to hold said leaves firmly enough so that the cake cannot possibly descend past them by its weight. When the drawer is shoved home the action of the cam surfaces 99 on the pins 98 will force them down against the resistance of the spring 95 and throw the leaves to the vertical full line position shown in Fig. 5, permitting the cake to drop down the passage 62 into the pocket 73 from which it can be withdrawn by the purchaser.

As the water condensed from the air by the action of the cold tends to freeze the parts together, to overcome this obstacle I form the surface of the casting 60 over which the drawer slides with a series of corrugations 101, see Figs. 2 and 6, which slope from the front downward toward the rear, so that any water condensing thereon will flow to the rear and into the trough formed by the lower portion of the sheet 56 and the portions 57 and 58. At some point in the trough formed by these portions I secure the small pipe 102 which extends downward therefrom through the bottom of the casing and through the supporting casting 26 so that the water can drain off. It will also be understood that I may provide the ice-holding casing 36 with a pipe 36ª (see Fig. 4) leading downward therefrom and opening into the trough 56, 57 and 58. This pipe is supplied with a cock (not shown) by which the brine may be drawn off before it is iced again. The air space 39 is connected with the cold air space 63 by apertures 126 (see Fig. 3) through the sheet metal 37.

Referring now more especially to Figs. 4 and 7 to 14, inclusive, it will be obvious that some locking means must be provided for the drawer controlled by the coin receiving mechanism, and for the present I may say said coin receiving mechanism is provided with the operating handle 103 secured in the rock shaft 104, which rock shaft is coupled with a larger rock shaft 105 journaled in the bearing 106 formed in the casting 60 near the forward end and also in the bearing 107 formed on the rear end of said casting, the shaft 105 having the collar 108 secured thereon by the screw 109 and engaging the bearing 107 to prevent the shaft 104 from being uncoupled from the shaft 105. The shaft 105 has formed therein the spline groove 110, in which slides the spline 111 having the downturned ends 112, seen in Fig. 14, which engage the outer faces of the pair of symmetrical disks 113 which have the inwardly projecting flanges 114 and the recesses 115 in which the spline 111 fits. These disks or cups 113 have portions of the flanges 114 cut away at 116 to form an aperture through which slides the short bolt 117 having the beveled end shown and the recess 118 therein into which fits the helically coiled expanding spring 119, the other end of which engages the sliding block 120 which rests on the shaft 105. The plunger 117 is provided with the arms or extensions 121 co-operating with the shaft 105 to guide the plunger and prevent its rocking. The two caps 113 are secured together by the screws 122. The drawer 54 is provided on the adjacent side with the pair of arms 123 forming a yoke co-operating with the disks 113 to slide them and the plunger 117 lengthwise of the shaft as the drawer is reciprocated. The drawer is also provided on the same side with an arm 124 having on its forward end the cam surface 125. The shaft 105 contains on the under side thereof a cam lug or pin 127 adapted to co-operate with the cam surface 125 as hereinafter described. The vertical wall 87 of the drawer supporting casting 60 has secured to the side thereof by the screws 128 a bar 129 best seen in Figs. 7, 8 and 9, which has the longitudinal body portion provided at its bottom with the inwardly extending narrow horizontal flange 130, which toward the rear end thereof widens out into the curved extension 131. At the rear end and at the upper portion is an inwardly and horizontally extending flange 132. Formed on the rear end of the flange 130 is a rib or cam surface 133, and pivoted in the widened rear end of this surface is the latch 134 normally held down in the horizontal position shown in dotted lines in Fig. 9 by the helically coiled contractile spring 135 secured thereto and to the casing beneath it. In the normal locked position of the parts, as seen in Fig. 10, the end of the plunger 117 engages the rear side of the curved flanged portion 131 and prevents the drawer being drawn out. Without the insertion of a coin the handle 103 may be turned through approximately 90 degrees, but not far enough to carry the plunger 117 past the end of the flange 131. When a coin is inserted, it can then be turned through approximately 180 degrees, and after it has turned the first 90 degrees, the plunger 117 engages the latch 134 and swings it back, as shown in full lines in Fig. 9, until it is turned past it, the parts in Fig. 11 occupying the position which the plunger must reach before the latch 134 can snap down in this position, and in the limit to which the shaft 105 can be turned by the handle, the plunger 117 engages the rear of the flange 132, so that before the drawer can be pulled out, the handle 103 must be turned back or allowed to turn back until the plunger 117 engages the now horizontally extending latch 134, in which position if the handle 70 of the drawer is pulled, the plunger 117 (now in the position shown in Fig. 12) is free to pass the flanges 130 and 132 so that the drawer can be drawn out to its full extent. As soon as the operator pulls the drawer out until the plunger 117 is in front of the flanges 131 and 132, the handle 103 may be released and the spring 136 (see Figs. 15, 16 and 17) rotates it and the shaft 105 backward until the plunger 117 engages the upper side of the flange 130. If the spring 136 should fail to rotate the shaft 105 thus far, the cam surface 125 engages the pin 127 and rocks the shaft so far, in which position the handle 103 is locked from again being turned forward until the drawer has been pulled out and shoved home again, where it is locked until another coin has been inserted, so that this locking mechanism prevents beating the machine. When the drawer is pulled out to the full extent possible, the dog 83 having passed the last of the teeth 82 is free to swing back and allow the drawer to be shoved home at which time the complete pawl stroke 83 will work in the opposite direction to compel the complete inward movement of the drawer before it can be drawn out again. When the drawer is shoved home, the handle 103 tends to turn all the way back under the pull of the spring 136 but it cannot so long as the plunger 117 engages the top of the flange 130, which is the position of the parts represented in Fig. 113. As the drawer is shoved home, the plunger 117 rides on the top of the flange 130, and finally engages the cam surface 133 by which it is forced inward until it passes completely to its extreme rear position in which it is beyond the rear of the flange 131, so that the spring 136 acting on the rock shaft 104 is free to swing the rock shaft 105 the rest of the way back to its normal position indicated in Fig. 10, in which normal position the drawer is once more locked and the cam surfaces 99 having acted on the pins 97, the leaves 91 are turned down and the package delivered.

As the coin receiving mechanism shown in Figs. 15, 16, 17 and 18, is not per se my invention, I will not describe the same in detail except as may be necessary for an understanding of its normal operation when the proper coin is inserted. If no coin is inserted, the rotation of the shaft 104 having the disk 137 (see Fig. 18) with the coin receiving recess 138 secured thereon is possible until the recess 139 in its periphery comes up to a horizontal position, where it is stopped from further movement by the inclined lower edge 140 of that end of the lever 141 catching the following edge of the recess 139. This stops the rotation of the rod 105, which has its adjacent semi-circular end 142 (see Fig. 17) fitting into the correspondingly shaped recess 143 formed in the cup-like hub 144 of the disk 145 which normally moves with the shaft 104, before the rod 105 has moved far enough to carry the plunger 117 past the latch 134, so the drawer cannot be drawn out until a coin is inserted and the handle turned the necessary 180 degrees.

When a coin is inserted in the recess 138 and the shaft 104 is turned to where the recess 139 was caught by the edge 140 of the lever 141 without the coin, the coin engages the projection 146 on the lever 141 which lever is fulcrumed upon the set-screw 147 (see Fig. 16) and swings the lever on its fulcrum against the pull of the tensile spring 148 enough to carry the edge 140 out of the plane of the disk 137, so that the shaft 104 can swing on without interference until its movement is stopped by the nose 149 of the dog 150 fulcrumed at 151 being pulled by the spring 152 into the recess 153 (see Fig. 15) of the disk 145. During this movement, the edge 140 of the lever 141 is held out of the recess 154 in the disk 137 the same way as it was held out of the recess 139.

When the handle 103 is released after its complete forward movement, the spring 136 (the upper end of which has been curved around the sheave-like member 155 secured on the shaft 104) pulls it back to its initial position, discharging the coin during its return movement through a passage formed between the projection 156 of the dog 150 and the top of the plate 157 (see Fig. 18). As soon as the shaft 104 has swung back far enough to discharge the coin from the recess 138 into the coin box, it is locked from a reversal by the fact that if a reversal now be attempted, the edge 140 will catch in the recess 154 in the same manner as it was described as catching in the recess 139 when no coin was originally inserted. The engagement of the cam surface 125 with the pin 127 (see Figs. 4, 7 and 8) forces the rod 105 and the shaft 104 back at least this far, if the spring 136 should fail to work, so that as the complete stroke mechanism 82, 83 and 84 prevents the working of the drawer back and forth, this mechanism prevents operating the machine, since the drawer can only be shoved back home when it is drawn out, and when it is shoved back home it is locked until another coin is inserted.

While I have shown and described my invention as embodied in the form which I at present consider best adapted to carry out its purposes, it will be understood that it is capable of modifications, and that I do not desire to be limited in the interpretation of the following claims, except as may be necessitated by the state of the prior art.

What I claim as new and desire to secure by Letters Patent of the United States is:

1. In a vending apparatus, the combination with an outer casing, of a vending magazine enclosed by the casing and having a delivery opening within the casing, a reciprocatable article delivering member having a portion thereof extending through the casing for direct manipulation and movable from and back to the delivering opening as it is reciprocated, a rod journaled in the casing parallel to the line of movement of the article delivering member rotatable through part of its arc only by hand to unlock the article delivering member, and locking connections to hold the rod in its rotated position in which the article delivering member is unlocked, until the latter has been reciprocated from and back to said delivery opening.

2. In a vending apparatus, the combination with a holding member, of a delivery member movable past the bottom of the holding member and having an article receiving aperture therethrough, a support for the delivery member over which it moves, said support having an article receiving aperture therethrough out of register with the holding member, temporary supports for the article in the bottom of the last mentioned article receiving aperture, and means for moving said supports.

3. In a vending apparatus, the combination with an outer casing, of a vending magazine enclosed by the casing and having a delivery opening within the casing, a reciprocatable article delivering member having a portion thereof extending through the casing for direct manipulation and movable from and back to the delivering opening as it is reciprocated, a rod journaled in the casing parallel to the line of movement of the article delivering member rotatable through part of its arc only by hand to unlock the article delivering member, locking mechanism interposed between the rod and the member to prevent the movement of the latter until the rod has been turned to a certain position, and means for turning the rod to said position.

4. In a vending apparatus, the combination with an outer casing, of a vending magazine enclosed by the casing and having a delivery opening within the casing, a reciprocatable article delivering member having a portion thereof extending through the casing for direct manipulation and movable from and back to the delivering opening as it is reciprocated, a rod journaled in the casing parallel to the line of movement of the article delivering member rotatable through part of its arc only by hand to unlock the article delivering member, locking mechanism interposed between the rod and the member to prevent the movement of the latter until the rod has been turned to a certain position, means for turning the rod to said position, and connections between the member and the rod whereby the latter is returned to its initial position as the member is moved back to its initial position.

5. In a vending apparatus, the combination with an article holder having a discharge orifice, of an article delivering device reciprocating past the discharge orifice, a locking rod parallel to the line of movement of the article delivery device, a radially movable spring pressed plunger splined on the rod, a fork carried by the article delivery device and embracing the plunger so as to slide it on the rod as the article delivery device reciprocates, and detent mechanism co-operating with the plunger to control its movement.

6. In a vending apparatus, the combination with an article holder having a discharge orifice, of an article delivering device reciprocating past the discharge orifice, a locking rod parallel to the line of movement of the article delivery device, a radially movable spring pressed plunger splined on the rod, a fork carried by the article delivery device and embracing the plunger so as to slide it on the rod as the article delivery device reciprocates, detent mechanism co-operating with the plunger to control its movement, said detent mechanism consisting of a pair of separated locking flanges co-operating with the plunger which can move between them, and a pivoted detent moved by the plunger over the space between the locking flanges as it moves in one direction to prevent the plunger being drawn between them.

7. In a vending apparatus, the combination with an article holder having a discharge orifice, of an article delivering device reciprocating past the discharge orifice, a locking rod parallel to the line of movement of the article delivery device, a radially movable spring pressed plunger splined on the rod, a fork carried by the article delivery device and embracing the plunger so as to slide it on the rod as the article delivery device reciprocates, detent mechanism co-operating with the plunger to control its movement, said detent mechanism consisting of a pair of separated locking flanges co-operating with the plunger which can move between them, a pivoted detent moved by the plunger over the space between the locking flanges as it moves in one direction to prevent the plunger being drawn between them, and an extended flange parallel to the rod upon which the plunger slides as the article delivery device is moved back.

8. In a vending apparatus, the combination with an article holder having a discharge orifice, of an article delivering device reciprocating past the discharge orifice, a locking rod parallel to the line of movement of the article delivery device, a radially movable spring pressed plunger splined on the rod, a fork carried by the article delivery device and embracing the plunger so as to slide it on the rod as the article delivery device reciprocates, detent mechanism co-operating with the plunger to control its movement, said detent mechanism consisting of a pair of separated locking flanges co-operating with the plunger which can move between them, a pivoted detent moved by the plunger over the space between the locking flanges as it moves in one direction to prevent the plunger being drawn between them, and an extended flange parallel to the rod upon which the plunger slides as the article delivery device is moved back, said extended flange having a cam surface at its rear end to force the plunger inward as it passes it.

9. In a vending apparatus, the combination with an article holder having a discharge orifice, of an article delivering device reciprocating past the discharge orifice, a locking rod parallel to the line of movement of the article delivery device, a radially movable spring pressed plunger splined on the rod, a fork carried by the article delivery device and embracing the plunger so as to slide it on the rod as the article delivery device reciprocates, detent mechanism co-operating with the plunger to control its movement, a cam lug carried by the rod, and a cam surface carried by the article delivery device to co-operate with the cam lug to insure the return of the rod into locking position when the article delivery device is moved outwardly.

10. In a vending apparatus, the combination with an outer casing, of a vending magazine enclosed by the casing and having a delivery opening within the casing, a reciprocatable article delivering member having a portion thereof extending through the casing for direct manipulation and movable from and back to the delivering opening as it is reciprocated, a rod journaled in the casing parallel to the line of movement of the article delivering member rotatable through part of its arc only by hand to unlock the article delivering member, and locking mechanism interposed between the rod and the member to prevent the delivering movement of the latter until the rod has been turned forward to a certain position and then turned part of the way back.

11. In a vending apparatus, the combination with an outer casing, of a vending magazine enclosed by the casing and having a delivery opening within the casing, a reciprocatable article delivering member having a portion thereof extending through the casing for direct manipulation and movable from and back to the delivering opening at it is reciprocated, a rod journaled in the casing parallel to the line of movement of the article delivering member rotatable through part of its arc only by hand to unlock the article delivering member, locking mechanism interposed between the rod and the member to prevent the delivering movement of the latter until the rod has been turned forward to a certain position and then turned part of the way back, and means to turn said rod forward and back as described.

12. In a vending machine, the combination with a supply casing having a discharge aperture therein, of a member reciprocable past the discharge aperture of the casing to remove merchandise therefrom, a rod extending parallel to the line of movement of the member, locking mechanism interposed between the rod and the member to prevent the delivery movement of the latter until the rod has been turned forward to a certain position and then turned part of the way back, means to turn said rod forward and back as described, and connections between the member and the rod to rotate the latter still farther back when the member is given its operative stroke.

13. In a vending machine, the combination with a supply casing having a discharge aperture therein, of a member reciprocable past the discharge aperture of the casing to remove merchandise therefrom, a rod extending parallel to the line of movement of the member, locking mechanism interposed between the rod and the member to prevent the delivery movement of the latter until the rod has been turned forward to a certain position and then turned part of the way back, means to turn said rod forward and back as described, connections between the member and the rod to rotate the latter still farther back when the member is given its operative stroke to a position in which said means cannot again move forward until the member has been returned to its initial position, and means to compel the complete movement of said member forward and back before it can be reversed.

In witness whereof, I have hereunto set my hand this 2nd day of May A. D. 1921.

STANLEY W. WILKINSON.